US012603061B1

(12) United States Patent
Guo et al.

(10) Patent No.: US 12,603,061 B1
(45) Date of Patent: Apr. 14, 2026

(54) DISPLAY WITH BACKLIGHT DITHERING

(71) Applicant: Apple Inc., Cupertino, CA (US)

(72) Inventors: Feng Guo, Cupertino, CA (US); Yang Zhang, Saratoga, CA (US); Young Il Kim, San Jose, CA (US); Jingdong Chen, San Jose, CA (US); Zhijun Qian, San Jose, CA (US); Venkataraman V Iyer, San Diego, CA (US); Lingyu Hong, San Jose, CA (US); Chengrui Le, Beijing (CN); Kevin W Sliech, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/633,969

(22) Filed: Apr. 12, 2024

Related U.S. Application Data

(60) Provisional application No. 63/505,945, filed on Jun. 2, 2023.

(51) Int. Cl.
*G09G 3/34* (2006.01)

(52) U.S. Cl.
CPC ... *G09G 3/3426* (2013.01); *G09G 2320/0233* (2013.01); *G09G 2320/064* (2013.01); *G09G 2340/0435* (2013.01)

(58) Field of Classification Search
CPC .............................................. G09G 2320/0233
See application file for complete search history.

(56) References Cited

U.S. PATENT DOCUMENTS

| | | | | |
|---|---|---|---|---|
| 7,573,457 | B2 | 8/2009 | Daly | |
| 8,184,089 | B2 | 5/2012 | Botzas et al. | |
| 9,837,030 | B2 | 12/2017 | Verbeure | |
| 10,901,260 | B2 | 1/2021 | Liu et al. | |
| 11,322,072 | B1 * | 5/2022 | Kang | G09G 3/20 |
| 2008/0068293 | A1 | 3/2008 | Ishii | |
| 2008/0094426 | A1 | 4/2008 | Kimpe | |
| 2011/0025592 | A1 * | 2/2011 | Botzas | G09G 3/3406 345/102 |
| 2011/0248974 | A1 * | 10/2011 | Murai | G09G 3/3426 345/207 |
| 2017/0358255 | A1 * | 12/2017 | Wang | G09G 3/2055 |
| 2023/0260445 | A1 * | 8/2023 | Jang | G09G 3/2044 345/690 |
| 2024/0078954 | A1 * | 3/2024 | Ishizawa | G09G 3/2048 |

* cited by examiner

*Primary Examiner* — Gustavo Polo
(74) *Attorney, Agent, or Firm* — Treyz Law Group; Jason Tsai

(57) ABSTRACT

An electronic device is provided that includes display pixels configured to update at a fixed or variable refresh rate, a backlight unit for illuminating the display pixels, and associated backlight driver circuitry configured to drive the backlight unit and configured to operate in a first reset mode during which a dither counter in the backlight driver circuitry is reset when the display pixels are being refreshed at a fixed refresh rate and in a second non-reset mode during which the dither counter is not reset even when the display pixels are being refreshed at a variable refresh rate. The backlight driver circuitry can include a brightness controller configured to output a brightness code, a memory circuit configured to store a dither table coupled to a dither counter, an adder, a clipping circuit, and a backlight driver.

18 Claims, 9 Drawing Sheets

74

| | count | | | | | | | |
|---|---|---|---|---|---|---|---|---|
| | 0 | 1 | 2 | 3 | 4 | 5 | 6 | 7 |
| 000 | 0 | 0 | 0 | 0 | 0 | 0 | 0 | 0 |
| 001 | 1 | 0 | 0 | 0 | 0 | 0 | 0 | 0 |
| 010 | 1 | 0 | 0 | 0 | 1 | 0 | 0 | 0 |
| 011 | 1 | 0 | 1 | 0 | 1 | 0 | 0 | 0 |
| 100 | 1 | 0 | 1 | 0 | 1 | 0 | 1 | 0 |
| 101 | 1 | 1 | 1 | 0 | 1 | 0 | 1 | 0 |
| 110 | 1 | 1 | 1 | 0 | 1 | 1 | 1 | 0 |
| 111 | 1 | 1 | 1 | 1 | 1 | 1 | 1 | 0 |

86

87

88

89

3-bit LSB

*FIG. 5*

DISPLAY WITH BACKLIGHT DITHERING

This application claims the benefit of U.S. Provisional Patent Application No. 63/505,945, filed Jun. 2, 2023, which is hereby incorporated by reference herein in its entirety.

BACKGROUND

This relates generally to electronic devices with displays, and, more particularly, to displays with backlights.

Electronic devices such as computers and cellular telephones have displays. Some displays such organic light-emitting diode displays have arrays of pixels that generate light. In displays of this type, backlighting is not necessary because the pixels themselves produce light.

Other displays contain passive pixels that can alter the amount of light that is transmitted through the display to display information for a user. Passive pixels do not produce light themselves, so it is desirable to provide backlight for a display with passive pixels. Passive pixels may be formed from a layer of liquid crystal material formed between two electrode layers and two polarizer layers. It is within this context that the embodiments herein arise.

SUMMARY

A display may have an array of pixels for displaying images for a viewer. The array of pixels may be liquid crystal pixels formed from display layers such as a color filter layer, a liquid crystal layer, a thin-film transistor layer, an upper polarizer layer, and a lower polarizer layer.

The pixel array may be illuminated with backlight illumination from a backlight unit. The backlight unit may include an array of light-emitting diodes, with each light-emitting diode being placed in a respective cell. The brightness of each light-emitting diode may be changed in each display frame to optimize the viewing of the display. Different light-emitting diodes may have unique brightness magnitudes based on the content of the given display frame.

An aspect of the disclosure provides a display that includes a pixel array, a backlight unit having an array of light-emitting elements configured to illuminate the pixel array, a brightness controller configured to output a brightness code, a memory circuit configured to store a dither table that is addressed using a portion of the brightness code, and a backlight driver configured to output signals for controlling the array of light-emitting elements in the backlight unit based on the brightness code and a value output from the dither table. The display can further include a counter configured to output a count value for addressing the dither table stored on the memory circuit. The dither table stored on the memory circuit can be addressed using a number of least significant bits (LSBs) of the brightness code output from the brightness controller. The counter can be configured to be reset in accordance with a signal that is synchronized with a fixed refresh rate or a variable refresh rate of the pixel array. The counter can be configured to receive a reset signal that is not asserted when the pixel array is refreshed at a variable refresh rate.

An aspect of the disclosure provides a method that includes using a brightness controller to output a brightness code, using a dither table addressed using a portion of the brightness code to output a value, and controlling a backlight driver based on the brightness code and the value output from the dither table. The method can further include using the backlight driver to generate a pulse width modulated (PWM) signal or a direct current (DC) signal to drive a plurality of light-emitting diodes in a backlight unit of the display. The method can further include using a counter to output a count value for addressing the dither table. The method can further include refreshing the display at a fixed refresh rate, toggling the counter at a backlight update frequency that is an integer multiple of the fixed refresh rate, and operating the counter in a reset mode during which the counter is reset when the display is being refreshed. The method can further include refreshing the display at a variable refresh rate, toggling the counter at a fixed backlight update frequency, and operating the counter in a non-reset mode during which the counter is not reset as the display is being refreshed.

An aspect of the disclosure provides an apparatus that includes display pixels configured to update at a refresh rate, a backlight unit for illuminating the display pixels, and backlight driver circuitry configured to drive the backlight unit and configured to operate in a first mode during which a dither counter in the backlight driver circuitry is reset when the display pixels are being refreshed and in a second mode during which the dither counter in the backlight driver circuitry is not reset even when the display pixels are being refreshed. The backlight driver circuitry can include a brightness controller configured to output a brightness code, a memory circuit configured to store a dither table that is addressed using a portion of the brightness code and using a counter value output from the dither counter, and a backlight driver configured to output signals for controlling a plurality of light-emitting elements in the backlight unit based on the brightness code and a value output from the dither table.

BRIEF DESCRIPTION OF THE DRAWINGS

FIG. 5 is a diagram of an illustrative dither table in accordance with some embodiments.

DETAILED DESCRIPTION

Figure 1:
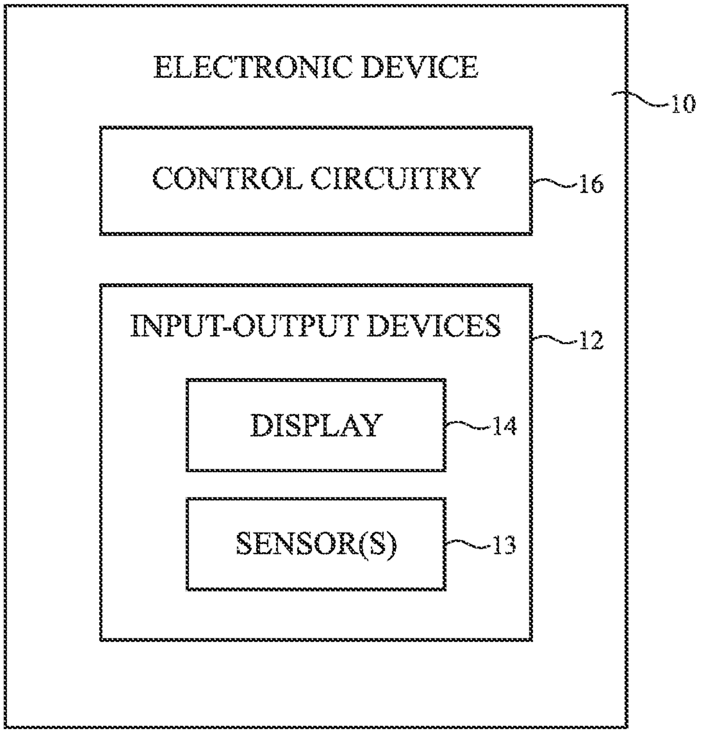
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn or mountable on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage and processing circuitry. The processing circuitry in control circuitry 16 may be used to control the operation of device 10. The processing circuitry may include on one or more microprocessors, microcontrollers, digital signal processors, host processors, baseband processor integrated circuits, application specific integrated circuits, central processing units (CPUs), power management units, audio chips, etc. Control circuitry 16 may be configured to perform operations in device 10 using hardware (e.g., dedicated hardware or circuitry), firmware, and/or software. Software code for performing operations in device 10 may be stored on the storage circuitry. The storage circuitry may include hard disk drive storage, nonvolatile memory (e.g., flash memory or other electrically-programmable-read-only memory configured to form a solid-state drive), volatile memory (e.g., static or dynamic random-access memory), and/or non-transitory (tangible) computer readable storage media that stores the software code. The software code may sometimes be referred to as program instructions, software, data, instructions, or code. Software code stored on the storage circuitry may be executed by the processing circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include one or more sensors 13 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 13 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 13 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be a liquid crystal display or may be a display based on other types of display technology (e.g., organic light-emitting diode displays). Device configurations in which display 14 is a liquid crystal display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
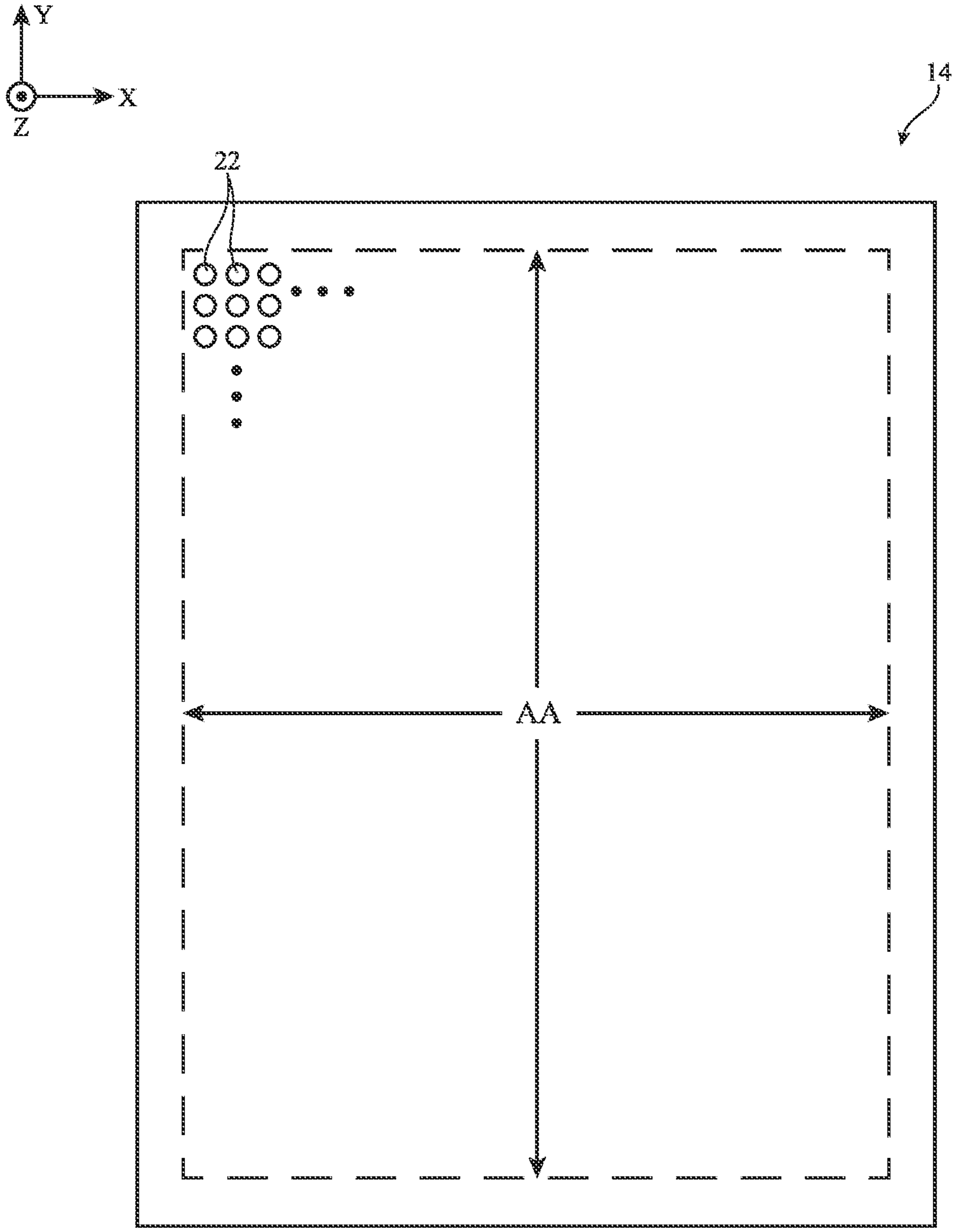
FIG. 2 is a top (plan) view of an illustrative display in accordance with some embodiments.

FIG. 2 is a top (plan) view of a portion of display 14 showing how display 14 may have an array of pixels 22. Pixels 22 in display 14 are sometimes referred to as display pixels. Display pixels 22 may have color filter elements of different colors such as red color filter elements R, green color filter elements G, and blue color filter elements B. Pixels 22 may be arranged in rows and columns and may form an active area AA of display 14 that is coplanar with the X-Y plane. Pixels 22 may be formed form liquid crystal display layers, as one example. The rectangular shape of display 14 and active area AA in FIG. 2 is merely illustrative. If desired, the active area AA may have a nonrectangular shape (e.g., a shape with one or more curved portions). For example, the active area may have rounded corners in one example.

Figure 3:
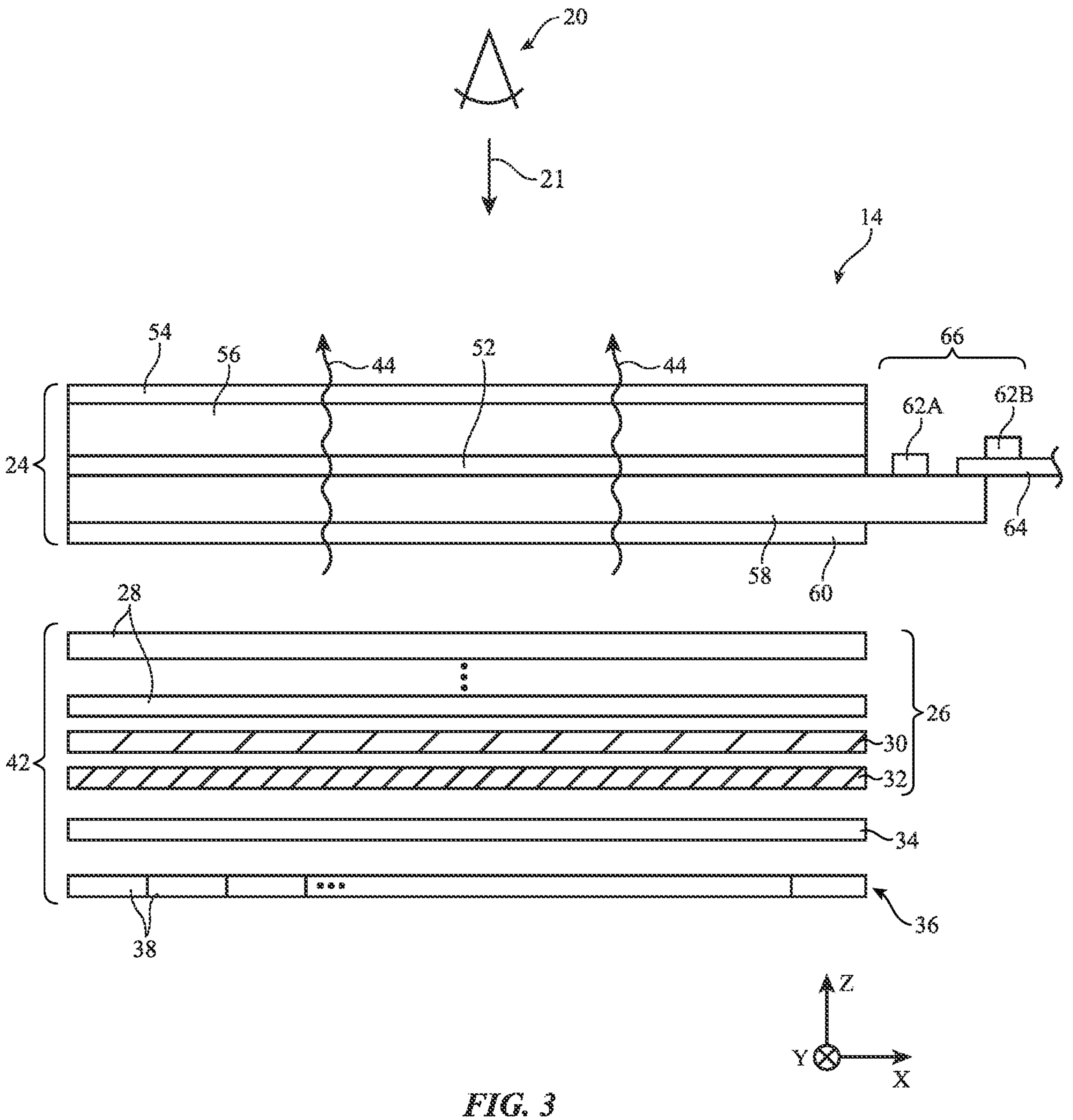
FIG. 3 is a cross-sectional side view of an illustrative display in an electronic device having a backlight and a pixel array in accordance with some embodiments.

A cross-sectional side view of display 14 is shown in FIG. 3. As shown in FIG. 3, display 14 may include a pixel array such as pixel array 24. Pixel array 24 may include an array of pixels such as display pixels 22 of FIG. 2 (e.g., an array of pixels having rows and columns of display pixels). Pixel array 24 may be formed from a liquid crystal display module (sometimes referred to as a liquid crystal display or liquid crystal layers) or other suitable pixel array structures.

During operation of display 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This backlight 44 illuminates any images on pixel array 24 for viewing by a viewer such as viewer 20 who is viewing display 14 in direction 21.

Backlight unit 42 may have optical films 26, a light diffuser such as light diffuser (light diffuser layer) 34, and light-emitting diode (LED) array 36. Light-emitting diode array 36 may contain a two-dimensional array of light sources such as light-emitting elements 38 (e.g., light-emitting diodes) that produce backlight illumination 44. Light-emitting diodes 38 may, as an example, be arranged in rows and columns and may lie in the X-Y plane of FIG. 3. Light-emitting elements 38 can be a light-emitting diode or can be implemented using other types light-emitting component(s).

The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

In a configuration in which pixel array 24 is formed using a liquid crystal display, pixel array 24 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. Liquid crystal display structures of other types may be used in forming pixel array 24, if desired.

Layers 56 and 58 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

The pixel array 24 can be refreshed at a display frame rate, whereas the backlight unit 42 can be operated at a backlight update frequency. The display frame rate is sometimes referred to as the "refresh rate" of the display. The backlight update frequency can be greater than the display frame rate. The backlight update frequency can optionally be a multiple of the display frame rate. As an example, the display frame rate can be equal to 120 Hz, whereas the backlight update frequency can be equal to 960 Hz (e.g., or eight times the display frame rate). In general, the display frame rate can be equal to 120 Hz, 240 Hz, 144 Hz, 60 Hz, 30 Hz, greater than 60 Hz, greater than 120 Hz, greater than 240 Hz, less than 60 Hz, less than 30 Hz, less than 10 Hz, 1-10 Hz, or other display frame rate. The backlight update frequency can be at least two times the display frame rate, two to five times the display frame rate, five to ten times the display frame rate, or more than 10 times the display frame rate. Display configurations in which the backlight update frequency is an integer multiple of the display frame rate is sometimes described herein as an example.

The backlight unit 42 can be driven by associated backlight driver circuitry. For instance, the backlight driver circuitry can drive the LED array 36 using PWM (pulse width modulated) signals. The PWM signals can have a PWM frequency that is much greater than the backlight update frequency. As an example, a backlight update frequency of 960 Hz can be paired with a PWM frequency of 20 kHz. This is merely illustrative. In general, the PWM frequency of the backlight driver circuitry can be at least 10 times the backlight update frequency, at least 20 times the backlight update frequency, 1-10 times the backlight update frequency, 10-20 times the backlight update frequency, 20-50 times the backlight update frequency 50-100 times the backlight update frequency, or more than 100 times the backlight update frequency.

The PWM signals can include a series of pulses with adjustable pulse widths that determine the overall brightness of the illumination provided by backlight unit 42 (and thus the overall brightness of display 14). Wider/longer pulse widths of the PWM signals result in brighter backlight illumination (and thus a brighter display), whereas narrower/shorter pulse widths of the PWM signals result in a more muted backlight illumination (and thus a dimmer display). The adjustability or step size of the backlight brightness depends on the resolution of the backlight driver circuitry. In practice, however, even a relatively high resolution such as a 12-bit native resolution for the backlight driver circuitry can result in uneven (jagged) transitions in brightness, especially at lower brightness levels. It would therefore be desirable to provide improved backlight driver circuitry.

Figure 4:
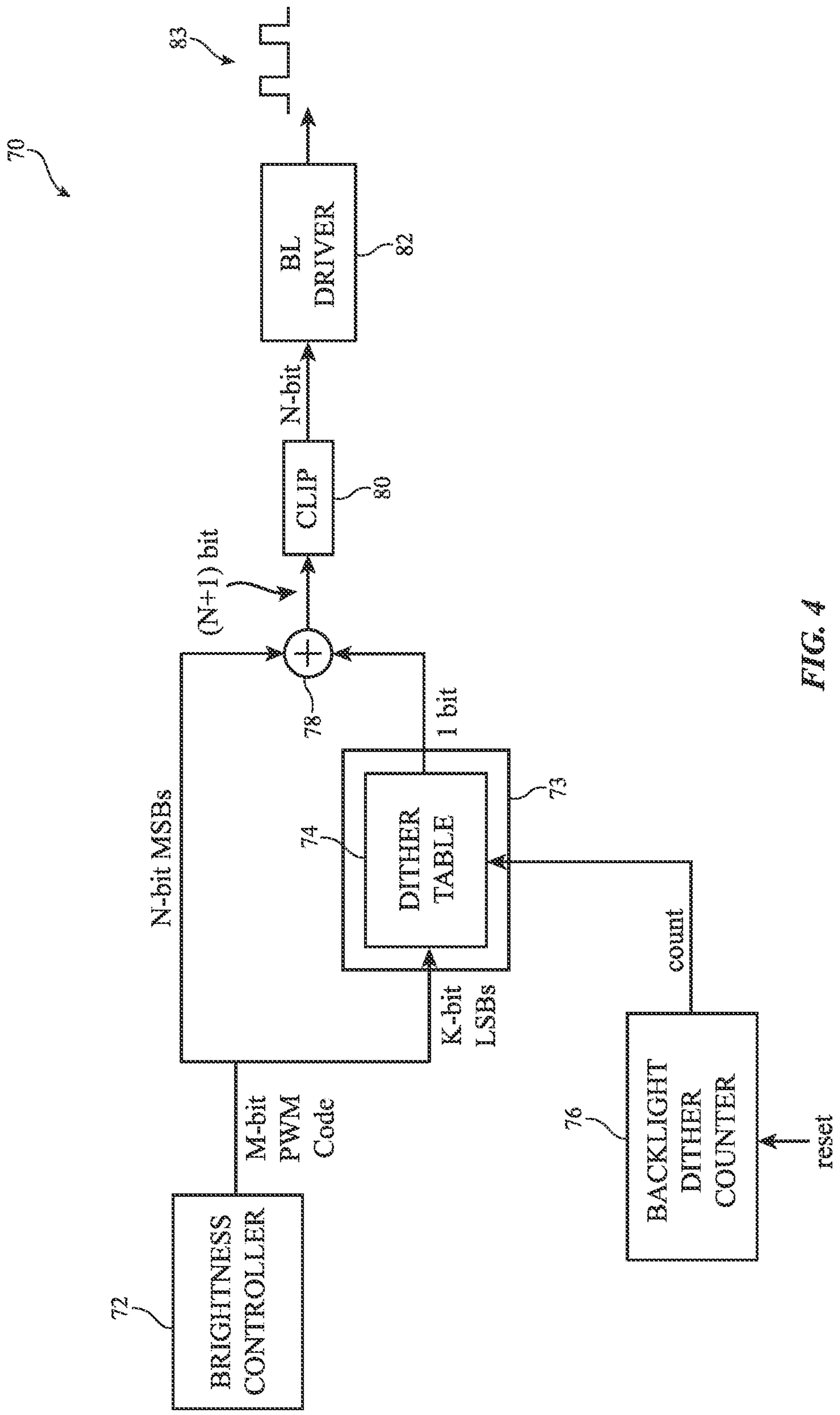
FIG. 4 is a diagram of illustrative backlight driver circuitry in accordance with some embodiments.

In accordance with an embodiment, electronic device 10 can be provided with backlight driver circuitry such as backlight driver circuitry 70 with dithering capabilities (see, e.g., FIG. 4). Backlight driver circuitry 70 can be considered part of or separate from backlight unit 42. Dithering the pulse widths of the PWM signals output by backlight driver circuitry 70 can be technically advantageous and beneficial by enhancing the LED drive native resolution, smoothing out the backlight brightness change step, mitigating flicker, and/or mitigating acoustic risk by enabling even higher PWM frequencies (e.g., PWM frequencies greater than 20 kHz).

As shown in FIG. 4, backlight driver circuitry 70 may include a brightness control circuit such as brightness controller 72, a memory circuit 73 configured to store a lookup table (LUT) such as dither table 74, a counter circuit such as backlight dither counter 76, an addition/summing circuit such as adder 78, a clipping circuit such as clipper 80, and a backlight driver circuit such as backlight driver 82. Brightness controller 72 may be configured to output an M-bit PWM code. The M-bit PWM code output by brightness controller 72 can be adjusted by a user of device 10, can be automatically adjusted based on an ambient lighting condition surrounding device 10, and/or based on other dynamic factors in the environment. The M-bit PWM code is therefore sometimes referred to as a brightness code. Memory circuit 73 can be part of the storage circuitry in control circuitry 16 in FIG. 1. Memory circuit 73 can be a non-volatile memory device, a volatile memory device, or other types of memory.

Here, the backlight driver 82 can have an N-bit native resolution (see N-bit input of backlight driver 82). The resolution of the PWM code output from brightness controller 72 (defined herein as an integer "M") may be greater than the native resolution of the backlight driver 82 (defined herein as an integer "N"). As an example, M may be equal to 15 bits, whereas N may be equal to 12 bits. This is merely illustrative. The native backlight driver resolution N can be 5-10 bits, 10-15 bits, 15-20 bits, or more than 20 bits, whereas the PWM code resolution M can be at least one bit greater than N, at least two bits greater than N, at least three bits greater than N, 2-5 bits greater than N, or more than 5 bits greater than N.

The upper N most significant bits (MSBs) of the M-bit PWM code can be provided to a first input of adder 78. The lower K least significant bits (LSBs) of the M-bit PWM code can be fed as an input to dither table 74. In other words, (N+K) is equal to M, so K is equal to (M−N). Dither table 74 may be addressed or indexed using the K-bit LSBs and a count value output from backlight dither counter 76. The count value of the backlight dither counter 76 can be selectively reset to zero (e.g., by asserting a reset signal that is provided as an input to counter 76). The count value of the backlight dither counter 76 can change or toggle at the backlight update frequency (e.g., counter 76 can be updated at a rate equal to the backlight update frequency). The backlight update frequency is therefore sometimes also referred to and defined herein as a "dither counter update frequency."

The operation of dither table 74 is best understood in conjunction with the description of FIG. 5. FIG. 5 shows a diagram of an exemplary dither table 74 that is addressed using a 3-bit LSB (where K=3) and using a 3-bit count value. The value of the 3-bit LSB from the PWM code determines which row in table 74 is selected, whereas the current count value output from counter 76 determines which column in table 74 is selected. As an example, a 3-bit LSB of "011" and a count value of "2" will result in dither table 74 outputting a logic value of "1" (as indicated by table entry 86). As another example, a 3-bit LSB of "011" and a count value of "6" will result in dither table 74 outputting a logic value of "0" (as indicated by table entry 87). As another example, a 3-bit LSB of "110" and a count value of "5" will result in dither table 74 outputting a logic value of "1" (as indicated by table entry 88). As another example, a 3-bit LSB of "111" and a count value of "7" will result in dither table 74 outputting a logic value of "0" (as indicated by table entry 89). In other words, dither table 74 can be configured to output a 1-bit value to a second input of adder 78 (see FIG. 4). As shown in FIG. 5, the ones and zeros in each row of dither table 74 can be evenly distributed or spread out in time to help minimize an average error that might arise in the non-reset mode (see, e.g., FIGS. 6 and 8). In other words, the "1s" and "0s" are alternated as much as possible depending on the number of "1s" in each row of table 74.

The dither table 74 with 8×8 entries shown in FIG. 5 is illustrative. In general, dither table 74 can be provided with any number of rows and any number of columns. The value of K can determine the number of rows in table 74. If K is equal to 2, then the number of rows in table 74 will be equal to 4. If K is equal to 4, then the number of rows in table 74 will be equal to 16. If K is equal to 5, then the number of rows in table 74 will be equal to 32. In general, the number of rows in table 74 will be equal to 2^K. The bit width of the count value can determine the number of columns in table 74. If the count is a 2-bit value, then the number of columns in table 74 will be equal to 4. If the count is a 4-bit value, then the number of columns in table 74 will be equal to 16. If the count is a 5-bit value, then the number of columns in table 74 will be equal to 32. In general, the number of columns in table 74 will be equal to 2^(the bit width of the count value).

Referring back to FIG. 4, adder 78 may receive the N-bit MSBs directly from brightness controller 72 and a 1-bit value from dither table 74 and output a corresponding (N+1) bit sum. Since backlight driver 82 is capped to a native resolution of N bits, signal clipping circuit 80 can truncate the sum output from adder 78 (e.g., to discard the MSB of the sum value). The clipped signal value can then be provided to an input of backlight driver 82 to set the pulse width of the PWM signals being output by driver 82. Backlight driver 82 may output PWM signals 83 that can be fed to the LED array 36.

Figure 6:
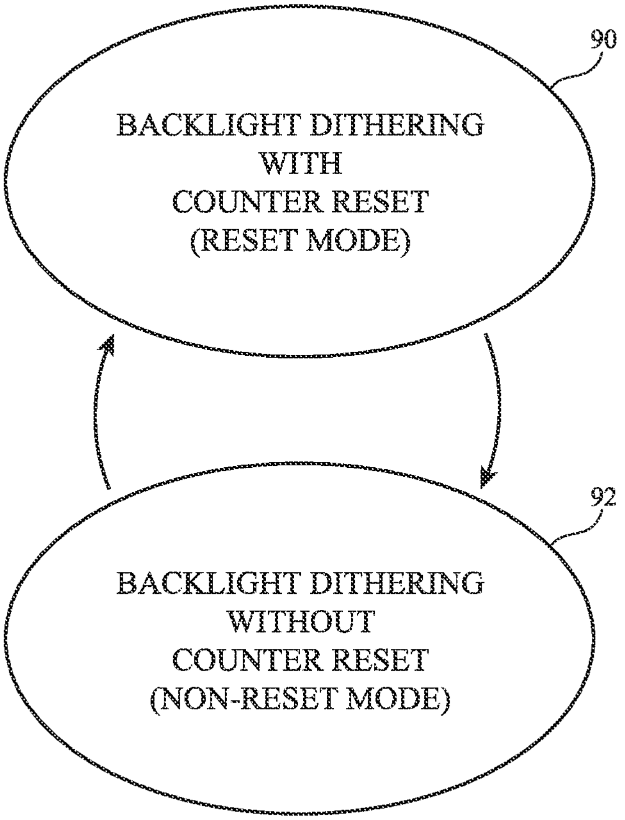
FIG. 6 is a diagram showing how the backlight driver circuitry shown in FIG. 4 can be operated in at least two different modes in accordance with some embodiments.

FIG. 6 is a diagram showing how backlight driver circuitry 70 of the type shown in FIG. 4 can be operated in at least two different modes. As shown in FIG. 6, backlight driver circuitry 70 may be operable in a first mode 90 and a second mode 92. In the first mode 90, backlight dithering can be performed with counter reset. The first mode 90 is therefore sometimes referred to as a reset mode or a counter reset mode. In the reset mode 90, backlight dither counter 76 can be reset periodically or on demand using a reset signal.

Figure 7:
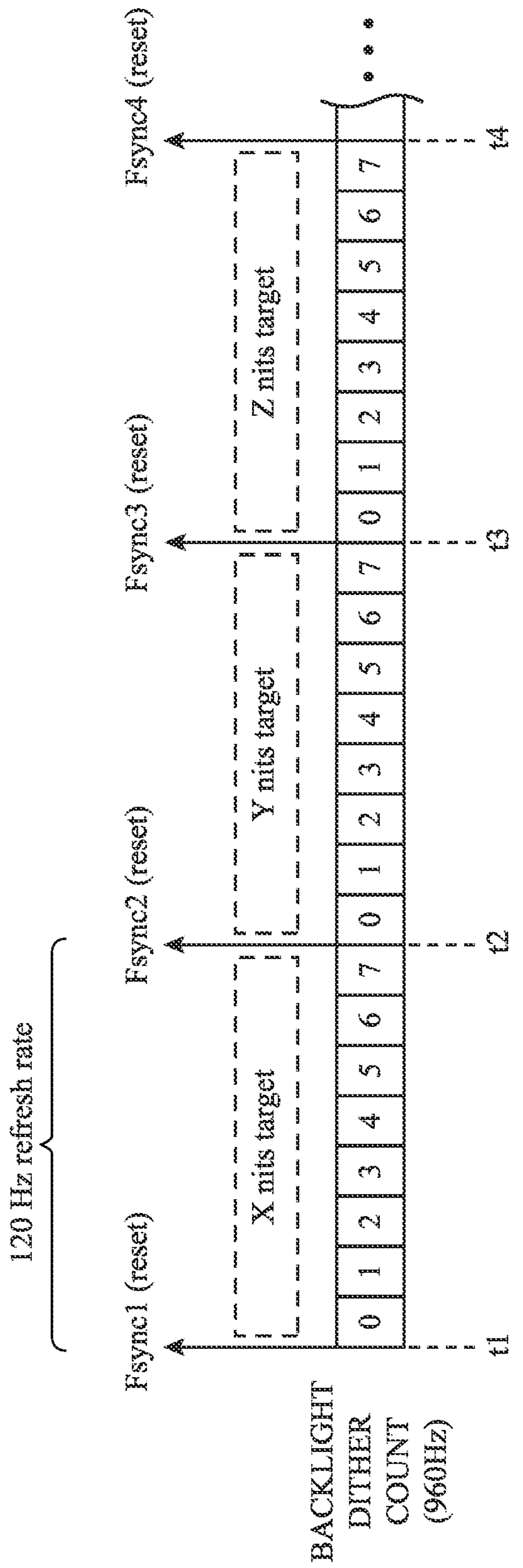
FIG. 7 is a timing diagram illustrating backlight dithering with counter reset in accordance with some embodiments.

The operation of the counter reset mode 90 is best understood in conjunction with the timing diagram of FIG. 7. As shown in the example of FIG. 7, the display may be updated at a refresh rate (or frame rate) of 120 Hz, whereas the backlight dither counter 76 can toggle its count value in accordance with a backlight update frequency of 960 Hz.

For instance, at time t1, a first synchronization signal Fsync1 can be asserted to initiate a first display refresh operation. Assertion of the first synchronization signal Fsync1 can reset the dither count value to "0" (as shown at time t1). After time t1, the count value of dither counter 76 can monotonically increase (e.g., from 0 to 7) at the backlight update frequency. From time t1 to t2, the display may have a target brightness value of X nits as determined by the M-bit PWM code output from brightness controller 72. As the count value increases, the dither table 74 will output corresponding values based on the target brightness value X and based on the current count value.

The number of ones and zeros output from dither table 74 effectively introduces intermediate step sizes by averaging across time. For example, the fifth row of table 74 in FIG. 5 corresponding to 3-bit LSBs of "100" yields a row of table values "10101010" as the count value increases over time (e.g., a row with alternating ones and zeros). Since ones appear half of the time, this effectively introduces a step size of 0.5 for the resulting N-bit code controlling backlight driver 82. As another example, the third row of dither table 74 in FIG. 5 corresponding to 3-bit LSBs of "010" yields a row of table values "10001000" as the count value increases over time. Since ones appear a quarter of the time, this effectively introduces a step size of 0.25 in the resulting N-bit code that controls backlight driver 82. Operated in this way to effectively introduce fractional step sizes, the use of counter dithering can therefore enhance the backlight LED drive resolution.

At time t2, a second synchronization signal Fsync2 can be asserted to initiate a second display refresh operation. Assertion of the second synchronization signal Fsync2 can again reset the dither count value to "0" (as shown at time t2). After time t2, the count value of dither counter 76 can monotonically increase (e.g., from 0 to 7) at the backlight update frequency. From time t2 to t3, the display may have a target brightness value of Y nits as determined by the M-bit PWM code output from brightness controller 72. Target brightness Y may be different or same as target brightness X of the first refresh operation. As the count value increases from time t2 to t3, the dither table 74 will output corresponding values based on the target brightness value Y and based on the current count value.

At time t3, a third synchronization signal Fsync3 can be asserted to initiate a third display refresh operation. Assertion of the third synchronization signal Fsync3 can again reset the dither count value to "0" (as shown at time t3). After time t3, the count value of dither counter 76 can monotonically increase (e.g., from 0 to 7) at the backlight update frequency. From time t3 to t4, the display may have a target brightness value of Z nits as determined by the M-bit PWM code output from brightness controller 72. Target brightness Z may be different or same as target brightness X or Y of the previous refresh operations. As the count value increases from time t3 to t4, the dither table 74 will output corresponding values based on the target brightness value Z and based on the current count value. At time t4, a fourth synchronization signal Fsync4 can be asserted to initiate a fourth display refresh operation. Assertion of the fourth synchronization signal Fsync4 can again reset the dither count value to "0" at time t4.

The counter reset mode as illustrated in FIG. 7 may be suitable for a display with fixed refresh rate. The counter reset mode of FIG. 7 may be suitable for a display where the backlight update frequency is synchronized with the refresh rate. For instance, in FIG. 7, exactly eight backlight counter updates occur within one refresh frame. This need not always be the case. In other embodiments, a synchronization signal indicative of the start of a refresh operation may occur when the current count value is not equal to 7. A refresh rate of 120 Hz and a backlight/counter update frequency of 960 Hz is also exemplary. In general, the display frame rate can be equal to 120 Hz, 240 Hz, 144 Hz, 60 Hz, 30 Hz, greater than 60 Hz, greater than 120 Hz, greater than 240 Hz, less than 60 Hz, less than 30 Hz, less than 10 Hz, 1-10 Hz, or other frame rate. The dither counter update frequency can be at least two times the frame rate, two to five times the frame rate, five to ten times the frame rate, or more than 10 times the frame rate. In some embodiments, the count reset mode can also be used for a display with a variable refresh rate (e.g., a display refresh scheme in which the refresh period can vary from frame to frame).

Referring back to FIG. 6, backlight dithering can be performed without counter reset in the second mode 92. The second mode 92 is therefore sometimes referred to as a no-reset mode or a counter non-reset mode. When operated in the non-reset mode 92, backlight dither counter 76 is never reset.

Figure 8:
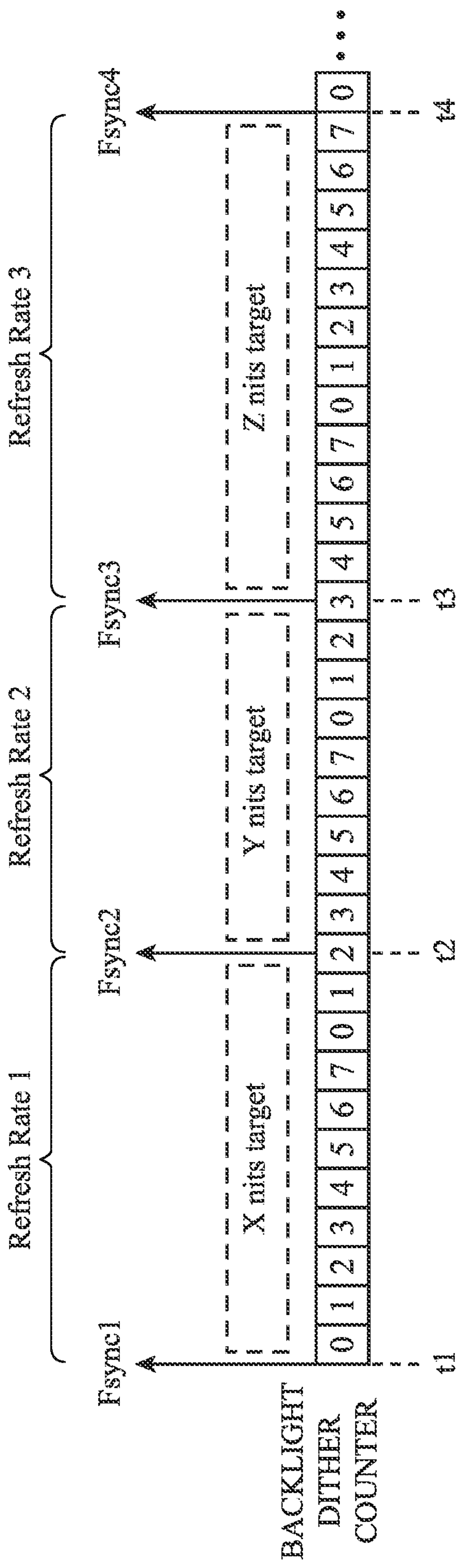
FIG. 8 is a timing diagram illustrating backlight dithering without counter reset in accordance with some embodiments.

The operation of the counter non-reset mode 92 is best understood in conjunction with the timing diagram of FIG. 8. As shown in the example of FIG. 8, the display may be updated at a varying refresh rates as determined by the Fsync signals, whereas the backlight dither counter 76 can toggle its count value in accordance with a fixed backlight update frequency (e.g., 960 Hz as an example).

For instance, at time t1, a first synchronization signal Fsync1 can be asserted to initiate a first display refresh operation. At time t1, the backlight dither counter 76 may begin counting up from zero (e.g., the count value of dither counter 76 can monotonically increase at the backlight update frequency). Assuming dither counter 76 is a 3-bit counter (as an example), the count value will loop back to zero once it reaches a maximum value of seven. From time t1 to t2, the display may have a target brightness value of X nits as determined by the M-bit PWM code output from brightness controller 72. As the count value increases, the dither table 74 will output corresponding values based on the target brightness value X and based on the current count value. As described above in connection with FIG. 7, the number of ones and zeros output from dither table 74 effectively introduces intermediate step sizes by averaging across time. The duration from time t1 to time t2 (when Fsync2 arrives) determines a first refresh rate.

At time t2, a second synchronization signal Fsync2 can be asserted to initiate a second display refresh operation. Unlike the reset example of FIG. 7, assertion of the second synchronization signal Fsync2 does not reset the dither count value to "0." Rather, the count value is allowed to continue increasing from its prior level. After time t2, the count value of dither counter 76 can continue to update at the backlight update frequency. From time t2 to t3, the display may have a target brightness value of Y nits as determined by the M-bit PWM code output from brightness controller 72. Target brightness Y may be different or same as target brightness X of the first refresh operation. As the count value increases from time t2 to t3, the dither table 74 will output corresponding values based on the target brightness value Y and based on the current count value. The number of ones and zeros output from dither table 74 from time t2 to t3 effectively introduces intermediate step sizes by averaging across time. The duration from time t2 to time t3 (when Fsync3 arrives) determines a second refresh rate.

At time t3, a third synchronization signal Fsync3 can be asserted to initiate a third display refresh operation. Unlike the reset example of FIG. 7, assertion of the third synchronization signal Fsync3 does not reset the dither count value to "0." Rather, the count value is allowed to continue increasing from its prior level. After time t3, the count value of dither counter 76 can continue to update at the backlight update frequency. From time t3 to t4, the display may have a target brightness value of Z nits as determined by the M-bit PWM code output from brightness controller 72. Target brightness Z may be different or same as target brightness X or Y from the previous refresh operations. As the count value increases from time t3 to t4, the dither table 74 will output corresponding values based on the target brightness value Z and based on the current count value. The number of ones and zeros output from dither table 74 from time t3 to t4 effectively introduces intermediate step sizes by averaging across time. The duration from time t3 to time t4 (when Fsync4 arrives) determines a third refresh rate.

The counter non-reset mode as illustrated in FIG. 8 may be suitable for a display with a variable refresh/frame rate. As shown in FIG. 8, the duration of the first, second, and third refresh operations can all be different. In the example of FIG. 8, the first refresh frame from time t1 to t2 has 10 backlight/counter updates; the second refresh frame from time t2 to t3 has 9 backlight/counter updates; and the third refresh frame from time t3 to t4 has 13 backlight/counter updates. In other words, each refresh frame can have a variable number of backlight/counter updates even when the backlight update frequency is fixed.

The embodiments of FIGS. 6-8 describing a reset mode and a non-reset mode are exemplary. If desired, device 10 can be further operated in a third mode where dithering is disabled. Backlight dithering can optionally be disabled by idling dither counter 76 (e.g., by fixing the count value output by counter 76).

Figure 9:
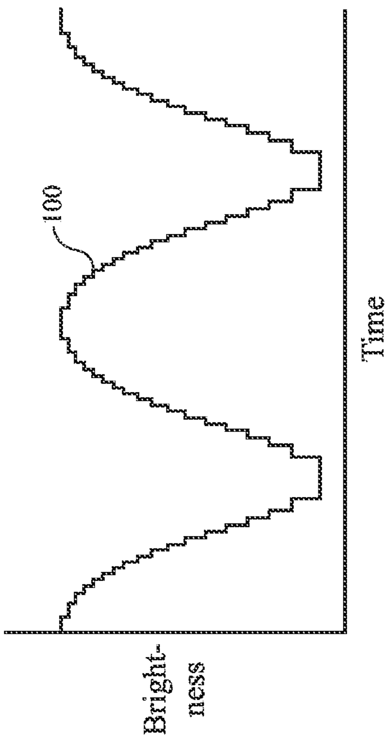
FIG. 9 is a plot of a display brightness waveform with backlight dithering disabled.

FIG. 9 is a plot of a display brightness waveform with backlight dithering disabled. In FIG. 9, waveform 100 plots the output brightness level of display 14 at various brightness settings over time. As shown in FIG. 9, waveform 100 can exhibit noticeable jumps due to larger step sizes in controlling the backlight driver 82 especially at lower brightness values. If care is not taken, this can lead to noticeable flicker.

Figure 10:
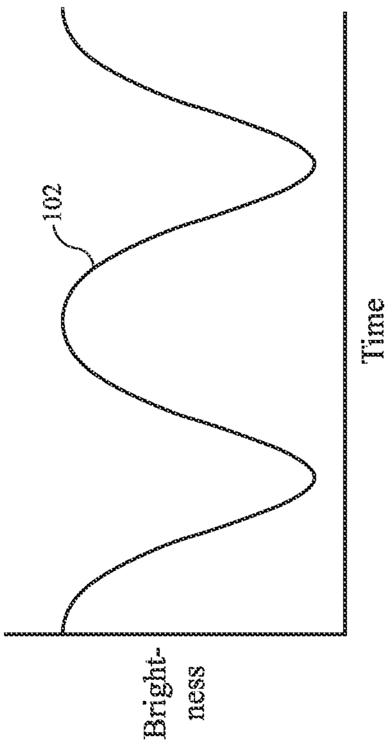
FIG. 10 is a plot of a display brightness waveform with backlight dithering enabled in accordance with some embodiments.

FIG. 10 is a plot of a display brightness waveform with backlight dithering enabled. In FIG. 10, waveform 102 plots the output brightness level of display 14 at various brightness settings over time. As shown in FIG. 10, waveform 102 is much smoother than waveform 100 of FIG. 9, even at lower brightness values. The use of backlight dithering can therefore smooth out the backlight brightness profile and can also improve flicker performance. The use of backlight dithering can also reduce acoustic risk by enabling higher PWM frequency (e.g., by enabling PWM frequencies of greater than 20 kHz).

The embodiments described herein that employ backlight dithering in the context of PWM-based backlight driving schemes are illustrative. In other embodiments, the backlight dithering techniques described herein can be applied to non-PWM backlight driving schemes such as DC (direct current) backlight driving schemes or other types of backlight driving schemes (modes). In the DC backlight driving mode, the backlight driver unit can generate a DC signal for controlling the light-emitting diodes, where the value of the DC signal can be dithered in accordance with the reset mode or the non-reset mode.

The methods and operations described above in connection with FIGS. 1-10 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., control circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., control circuitry 16 of FIG. 1, etc.). The processing circuitry may include microprocessors, central processing units (CPUs), application-specific integrated circuits with processing circuitry, or other processing circuitry. The components of FIG. 4 may be implemented using hardware (e.g., circuit components, digital logic gates, etc.) and/or using software where applicable.

The foregoing is merely illustrative and various modifications can be made by those skilled in the art without departing from the scope and spirit of the described embodiments. The foregoing embodiments may be implemented individually or in any combination.

What is claimed is:

1. A display comprising:

a pixel array;

a backlight unit having an array of light-emitting elements configured to illuminate the pixel array;

a brightness controller configured to output a brightness code;

a memory circuit configured to store a dither table that is addressed using a number of least significant bits (LSBs) of the brightness code output from the brightness controller;

a backlight driver configured to output signals for controlling the array of light-emitting elements in the backlight unit based on the brightness code and a value output from the dither table; and a counter configured to output a count value for addressing the dither table.

2. The display of claim 1, further comprising:

an adder having a first input configured to receive the value output from the dither table.

3. The display of claim 2, wherein the adder has a second input configured to receive a number of most significant bits (MSBs) of the brightness code output from the brightness controller.

4. The display of claim 3, further comprising:

a clipping circuit having an input coupled to the adder and having an output coupled to the backlight driver.

5. The display of claim 1, wherein the counter is configured to be reset in accordance with a signal that is synchronized with a fixed refresh rate or a variable refresh rate of the pixel array.

6. The display of claim 1, wherein the counter is configured to receive a reset signal and wherein the reset signal is not asserted when the pixel array is refreshed at a variable refresh rate.

7. The display of claim 1, wherein the counter is disabled.

8. The display of claim 1, wherein the dither table is configured to output a 1-bit value.

9. The display of claim 1, wherein the dither table has a row with alternating ones and zeros.

10. A method of operating a display comprising:

with a brightness controller, outputting a brightness code;

addressing a dither table using a number of least significant bits (LSBs) of the brightness code output from the brightness controller;

combining a number of most significant bits (MSBs) of the brightness code with a value output from the dither table to produce a combined value; and controlling a backlight driver based on the combined value.

11. The method of claim 10, further comprising:

with the backlight driver, generating a pulse width modulated (PWM) signal or a direct current (DC) signal; and using the PWM signal or the DC signal to drive a plurality of light-emitting diodes in a backlight unit of the display.

12. The method of claim 10, further comprising:

with a counter, outputting a count value for addressing the dither table.

13. The method of claim 12, further comprising:

clipping the combined value to produce a clipped value; and using the clipped value to control the backlight driver.

14. The method of claim 12, further comprising:

refreshing the display at a fixed refresh rate;

toggling the counter at a backlight update frequency that is an integer multiple of the fixed refresh rate; and operating the counter in a reset mode during which the counter is reset when the display is being refreshed.

15. The method of claim 12, further comprising:

refreshing the display at a variable refresh rate;

toggling the counter at a fixed backlight update frequency; and operating the counter in a non-reset mode during which the counter is not reset as the display is being refreshed.

16. An apparatus comprising:

display pixels;

a backlight unit for illuminating the display pixels; and backlight driver circuitry configured to drive the backlight unit and configured to operate in a first mode during which a dither counter in the backlight driver circuitry is reset when the display pixels are being refreshed at a fixed refresh rate and in a second mode during which the dither counter in the backlight driver circuitry is not reset even when the display pixels are being refreshed at a variable refresh rate.

17. The apparatus of claim 16, wherein the backlight driver circuitry comprises:

a brightness controller configured to output a brightness code;

a memory circuit configured to store a dither table that is addressed using a portion of the brightness code and using a counter value output from the dither counter; and a backlight driver configured to output signals for controlling a plurality of light-emitting elements in the backlight unit based on the brightness code and a value output from the dither table.

18. The apparatus of claim 17, wherein the backlight driver circuitry further comprises:

an adder having a first input configured to receive the value output from the dither table and having a second input configured to receive a number of most significant bits (MSBs) of the brightness code output from the brightness controller; and a clipping circuit having an input coupled to the adder and having an output coupled to the backlight driver.

* * * * *